United States Patent [19]

Carlin et al.

[11] Patent Number: 5,372,338
[45] Date of Patent: Dec. 13, 1994

[54] MOUNTING ARRANGEMENT FOR A GAS TURBINE ENGINE

[75] Inventors: Robert N. Carlin, Nottingham; Andrew W. Deighton, Derby, both of England

[73] Assignee: Rolls-Royce plc, London, England

[21] Appl. No.: 36,847

[22] Filed: Mar. 25, 1993

[30] Foreign Application Priority Data

Apr. 15, 1992 [GB] United Kingdom ............... 9208398

[51] Int. Cl.⁵ .......................... F02C 7/20; B64C 1/16
[52] U.S. Cl. .................... 244/54; 244/129.4; 244/129.5; 60/39.31
[58] Field of Search .............. 244/54, 129.5, 129.4, 244/118.2; 60/39.31

[56] References Cited

U.S. PATENT DOCUMENTS

| | | | |
|---|---|---|---|
| 3,222,017 | 12/1965 | Bobo | 60/39.31 |
| 3,809,340 | 5/1974 | Dolgy et al. | 244/54 |
| 3,979,087 | 9/1976 | Boris et al. | 244/54 |
| 4,037,809 | 7/1977 | Legrand | 244/54 |
| 4,238,092 | 12/1980 | Brennan | 244/54 |
| 4,266,741 | 5/1981 | Murphy | 244/54 |
| 4,585,189 | 4/1986 | Buxton | 244/129.4 |
| 5,046,689 | 9/1991 | Shine | 244/129.4 |

FOREIGN PATENT DOCUMENTS

| | | |
|---|---|---|
| 1520759 | 8/1978 | United Kingdom . |
| 2046193 | 11/1980 | United Kingdom . |
| 2151995 | 7/1985 | United Kingdom . |
| 2202588 | 9/1988 | United Kingdom . |

*Primary Examiner*—David A. Bucci
*Assistant Examiner*—Virna Lissi Ansley
*Attorney, Agent, or Firm*—Cushman, Darby & Cushman

[57] ABSTRACT

A nacelle of a gas turbine engine is attached via a pylon to an aircraft wing from which the engine is to be mounted. The nacelle is split to form a pair of opposing arcuate doors which are moveable between an open position and a closed position. When the doors are closed a ring on the fan casing locates in a correspondingly shaped groove on the inner surface of the arcuate doors. The nacelle is structurally integrated with the fan casing with the ring so that all the engine loads are transmitted through the nacelle. Telescopic struts are provided to connect the engine casings directly to the pylon so that when the arcuate doors are open, to allow access to the engine, the struts 50-60 support the engine.

13 Claims, 4 Drawing Sheets

MOUNTING ARRANGEMENT FOR A GAS TURBINE ENGINE

FIELD OF THE INVENTION

The present invention relates to a mounting arrangement by which a gas turbine engine is attached to an aircraft. In particular it relates to a mounting arrangement for connecting a gas turbine engine to a pylon of an aircraft wing.

BACKGROUND OF THE INVENTION

In conventional jet aircraft, each engine is typically mounted from an aircraft structure, such as a wing or fuselage, by a pylon. The pylon is connected directly to the engine casing so that the loads created by the thrust, the weight of the engine and any air loads acting on the engine during flight are all taken through the engine casing. This results in distortion of the engine casing particularly during aircraft manoeuvres. Rapid wear of the rotor tips occurs due to interference between the rotor tips and the distorted casing. To minimise damage to the rotor tips the clearances between the rotor tips and the casing are increased which increases the fuel consumption of the engine and reduces engine efficiency.

SUMMARY OF THE INVENTION

The present invention seeks to provide a mounting arrangement for a gas turbine engine which reduces the engine casing distortions.

According to the present invention a mounting arrangement for a gas turbine engine comprises a nacelle surrounding a gas turbine engine, the nacelle being attached via a support member to an aircraft structure from which the engine is to be mounted, at least a part of the nacelle being split to form a pair of opposing arcuate doors which are moveable between an open position to allow access to the engine and a closed position, there being provided means for structurally integrating the nacelle with the engine when the arcuate doors are closed so that all the engine loads are transmitted through the nacelle, there being further provided connecting means to connect the engine casing directly to the support member so that when the arcuate doors are open the further connection means support the engine, all the engine loads being transmitted through the engine casing.

Preferably the means for structurally integrating the arcuate doors of the nacelle when closed with the engine is a ring on the engine casing which locates in a correspondingly shaped groove on the inner surface of the arcuate doors of the nacelle. The ring may be integral with the engine casing or may be a separate sectional structure which is bolted together and is located on the engine casing by spherical bearings. The ring is preferably provided at the upstream end of the engine casing and may have a V shaped cross-section.

The further connection means which connect the engine to the support member when the arcuate doors are open are telescopic struts. The telescopic struts may be hydraulic rams which are moveable between a retracted and an extended position and which are selectively locked in a position to support the engine by a latch on the nacelle.

The whole of the nacelle may be split to form the arcuate doors. Thrust reversers may be provided in the arcuate doors of the nacelle.

The support member is preferably a pylon which may be attached to an aircraft wing.

BRIEF DESCRIPTION OF THE DRAWINGS

The present invention will now be described with reference to the accompanying drawings in which.

DETAILED DESCRIPTION OF THE INVENTION

Figure 1:
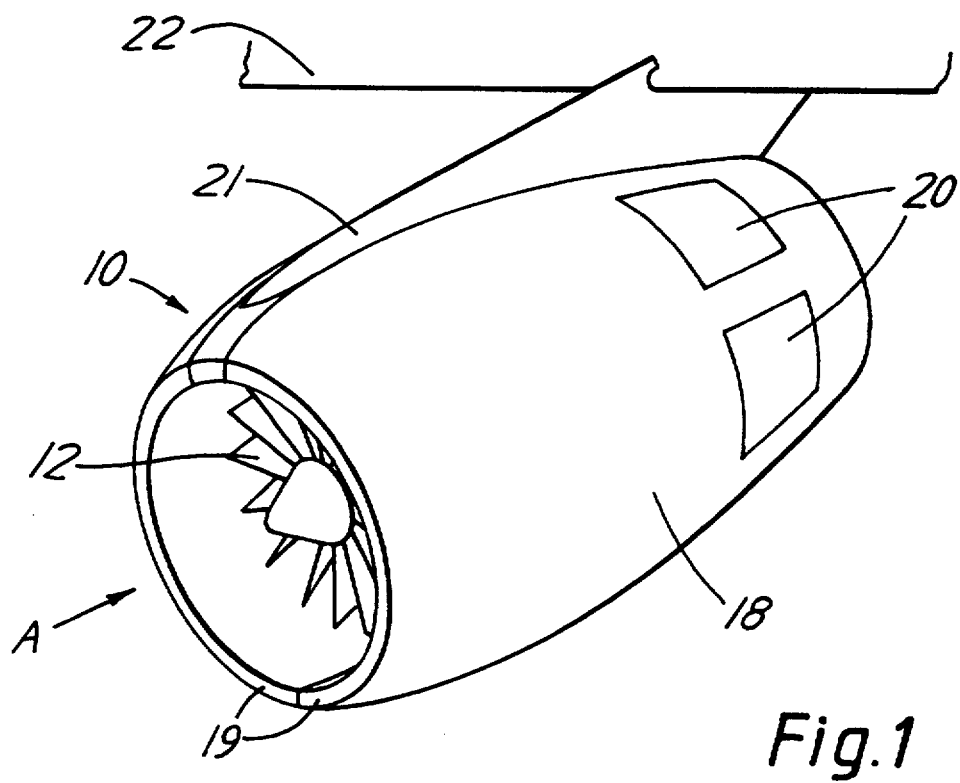
FIG. 1 is a pictorial view of a gas turbine engine having a pair of nacelle doors and incorporating a mounting arrangement in accordance with the present invention.

A gas turbine engine, generally indicated at 10, which operates in conventional manner has a fan stage 12 at its upstream end. The fan stage 12 is enclosed in a fan casing 14 and a further casing 16 encloses the remainder of the engine 10. The fan casing 14 and the engine casing 16 are surrounded by a nacelle 18. The nacelle 18, the fan casing 14 and the engine casing 16 are all connected to a pylon 21 extending from an aircraft structure 22 such as an aircraft wing.

The nacelle 18 is split to form two opposing arcuate doors 19, each door 19 has thrust reversers 20 mounted thereon. The doors 19 are hinged to allow movement between an open position to allow access to the engine 10 and a closed position. In the closed position the doors 19 are structurally integrated with the engine 10 so that all the engine loads are taken through the nacelle 18 to the pylon 21.

Figure 2:
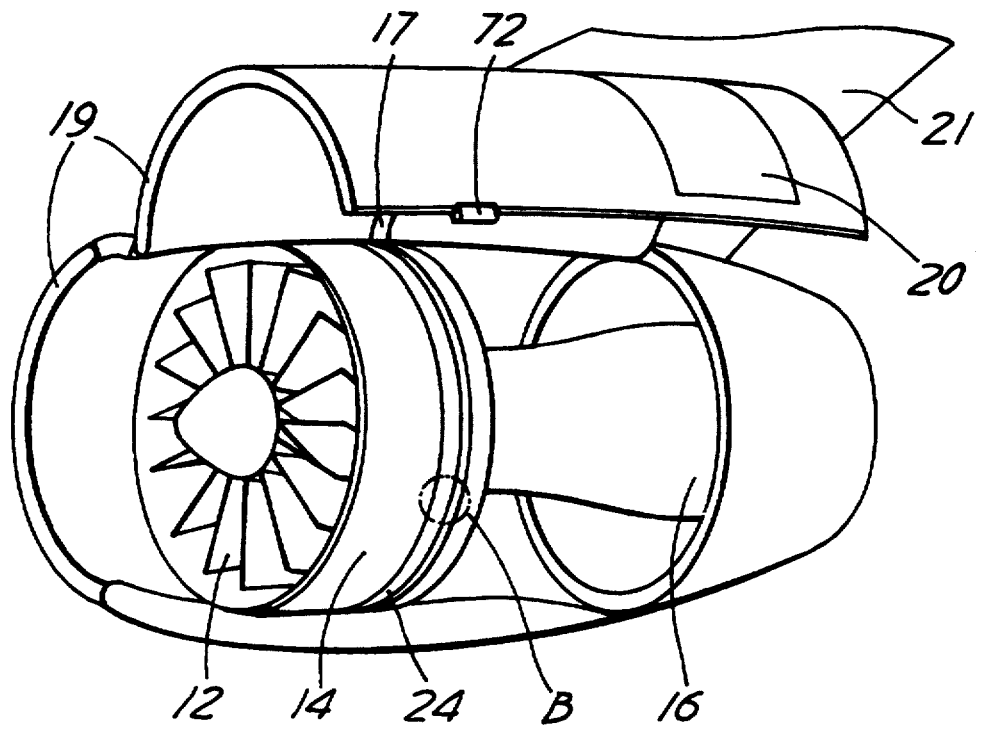
FIG. 2 is a pictorial view of a gas turbine engine incorporating a mounting arrangement in accordance with one embodiment of the present invention with one of the nacelle doors open.
Figure 3:
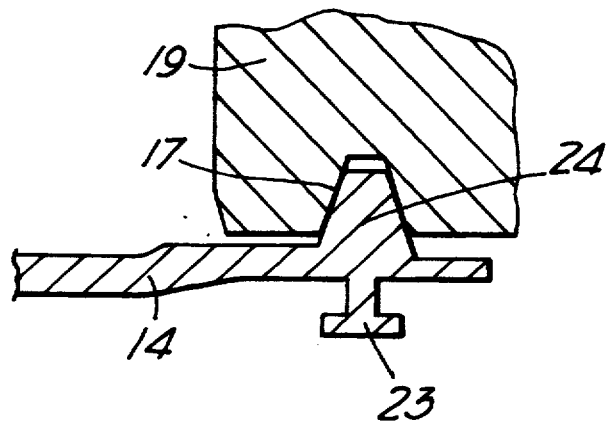
FIG. 3 is a cross-sectional view of region B in FIG. 2 when the nacelle doors are closed.

The nacelle 18 is structurally integrated with the engine 10 by a ring 24 provided around the fan casing 14 (FIG. 2). The ring 24 has a V shaped cross section and engages a correspondingly shaped groove 17 in the inner surface of the doors 19 of the nacelle 18. The ring 24 transfers vertical loads, as a result of the engine weight, and axial loads, created as a result of the engine thrust, to the doors 19 of the nacelle 18. The loads are transmitted through the nacelle 18 to the pylon 21 from which the engine 10 is mounted. The loads are taken around the circumference of the fan casing 14 and transmitted to the doors 19 of the nacelle 18. This gives the advantage that the loads are taken away from the engine axis removing thrust couple effects.

In the preferred embodiment of the present invention the ring 24 is formed integrally with the fan casing 14 of the engine 10 (FIG. 2). A stiffening ring 23 is also provided on the radially inner surface of the fan casing 14.

Figure 4:
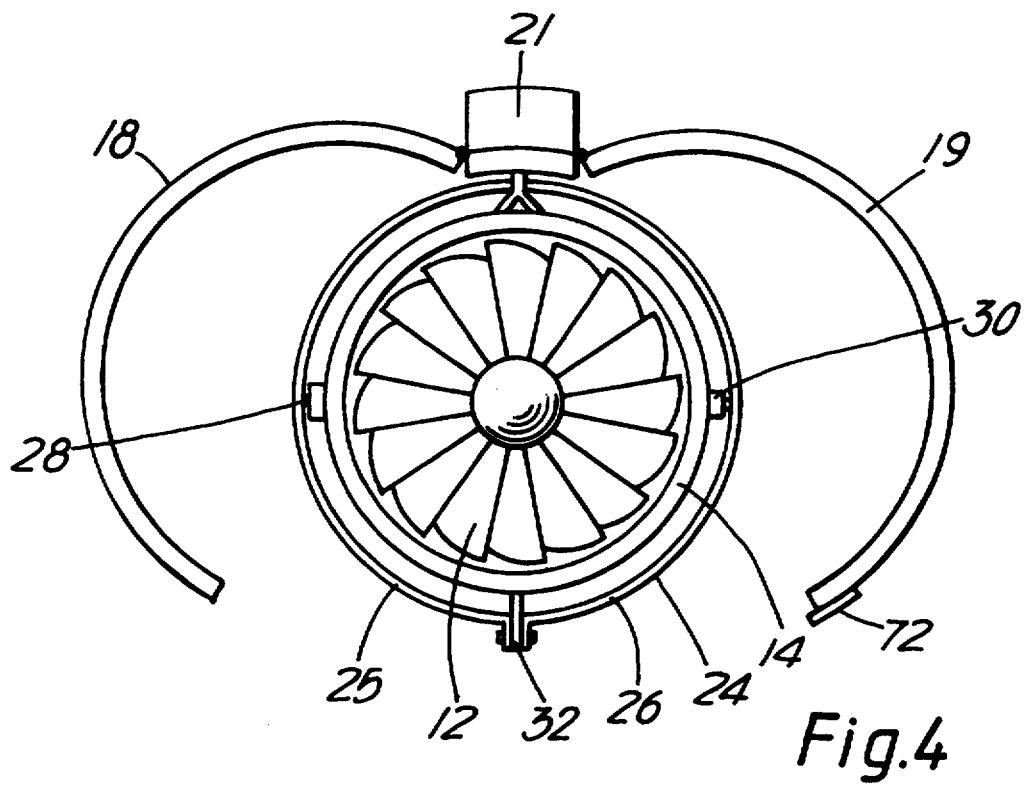
FIG. 4 is a view in the direction of arrow A in FIG. 1 of a second embodiment of the present invention when both nacelle doors are open.

A second embodiment of the present invention is shown in FIG. 4. For ease of assembly the ring 24 is split into two sections 25 and 26. Each of the sections 25 and 26 have radially inwardly extending trunnions 28 which locate in spherical bearings 30 on the fan casing 14. The two sections 25 and 26 of the ring 24 are bolted together at top and bottom dead centre of the engine 10. The two sections 25 and 26 are bolted at the bottom to a lug 32 which transfers torque loads from the engine 10 to the doors 19 of the nacelle 18.

Figure 5:
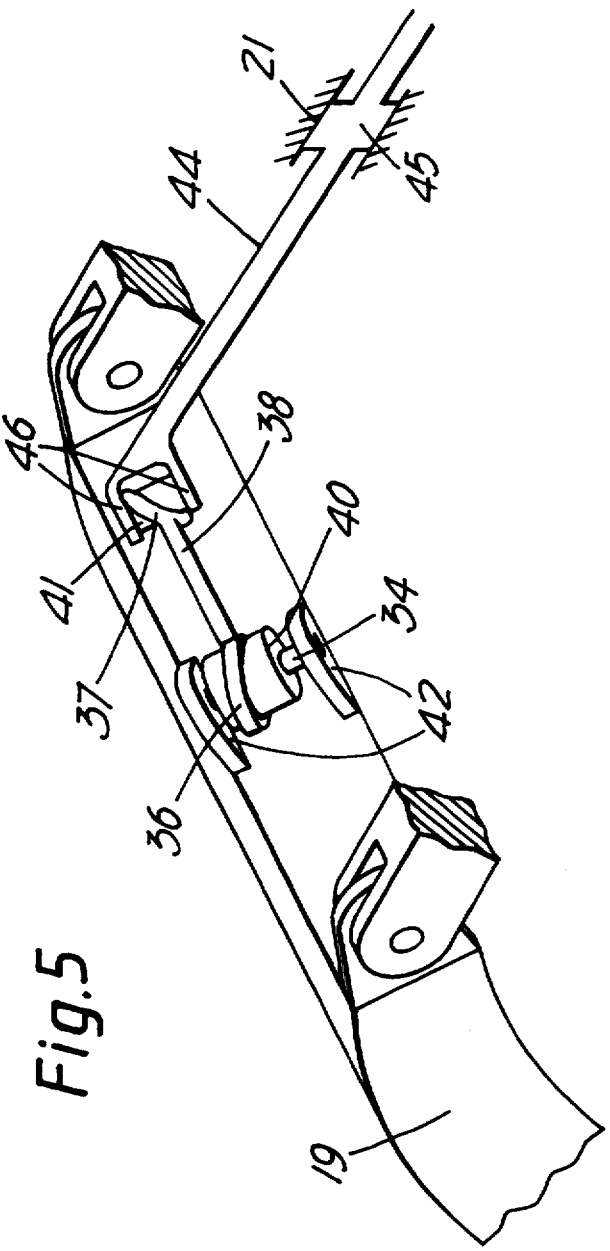
FIG. 5 is a pictorial view of a hinge on one of the nacelle doors.

The axial loads, created as a result of the engine thrust are transferred from each of the nacelle doors 19 to the pylon 21 by the arrangement shown in FIG. 5. The thrust loads are transferred through a pin 34 which locates the twisted end 36 of a bar 38 on a spherical bearing 40 between lugs 42. The other twisted end 37 of the bar 38 is mounted on a spherical bearing 41 and is connected by flanges 46 to a swivel tree 44. The ends 36 and 37 of the bar 38 are twisted, to opposite sides of the vertical to give the nacelle doors 19 the required opening movement. The bar 38 is either in tension or compression, depending on whether the engine thrust is forward or reverse, and transmits the loads to the swivel tree 44. The swivel tree 44 is connected to both of the nacelle doors 19. The swivel tree 44 is connected to the pylon 21 at its centre by a bearing 45 which allows the swivel tree 44 to swing about its axis. The purpose of the swivel tree 44 is to equalise the amount of thrust transferred to the pylon 21 from each of the nacelle doors 19.

Transmission of the engine loads to the nacelle 18 reduces the loads on the fan casing 14 and the engine casing 16 reducing casing distortions. By reducing the distortion of the casings 14 and 16 rotor tip clearances are reduced which improves specific fuel consumption and engine efficiency.

Figure 6:
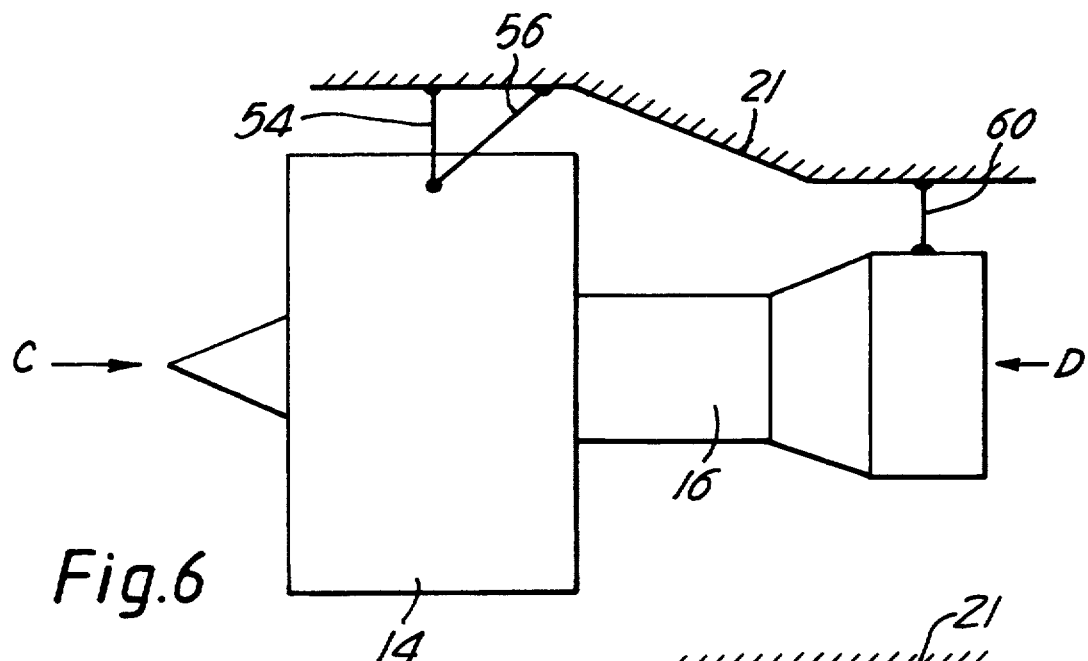
FIG. 6 is a schematic view of part of the mounting arrangement in accordance with the present invention in which the nacelle doors have been removed in the interest of clarity.
Figure 7:
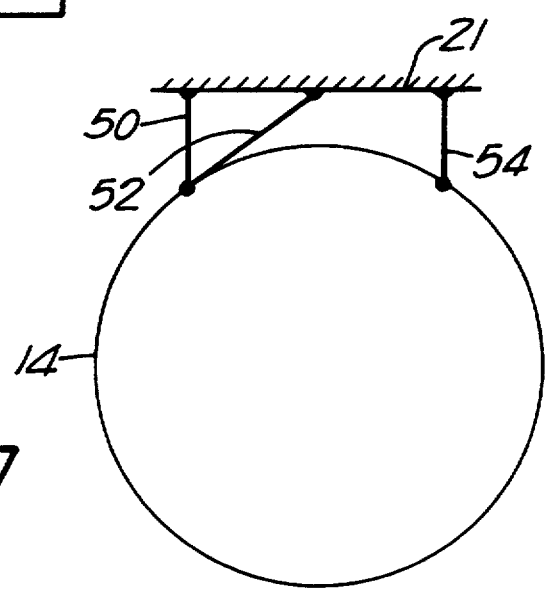
FIG. 7 is a view in the direction of arrow C in FIG. 6.
Figure 8:
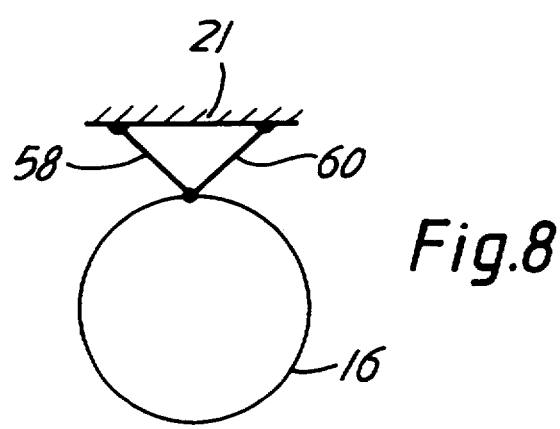
FIG. 8 is a view in the direction of arrow D in FIG. 6.

When the doors 19 of the nacelle 18 are open the engine is supported by a mounting arrangement shown in FIGS. 6-8. A number of telescopic struts 50-60 support the engine 10 the engine loads being taken directly through the casings 14 and 16 to the pylon 21. In the preferred embodiment of the present invention the telescopic struts 50-60 are hydraulic rams which are moveable between a retracted position and an extended position.

Figure 9:
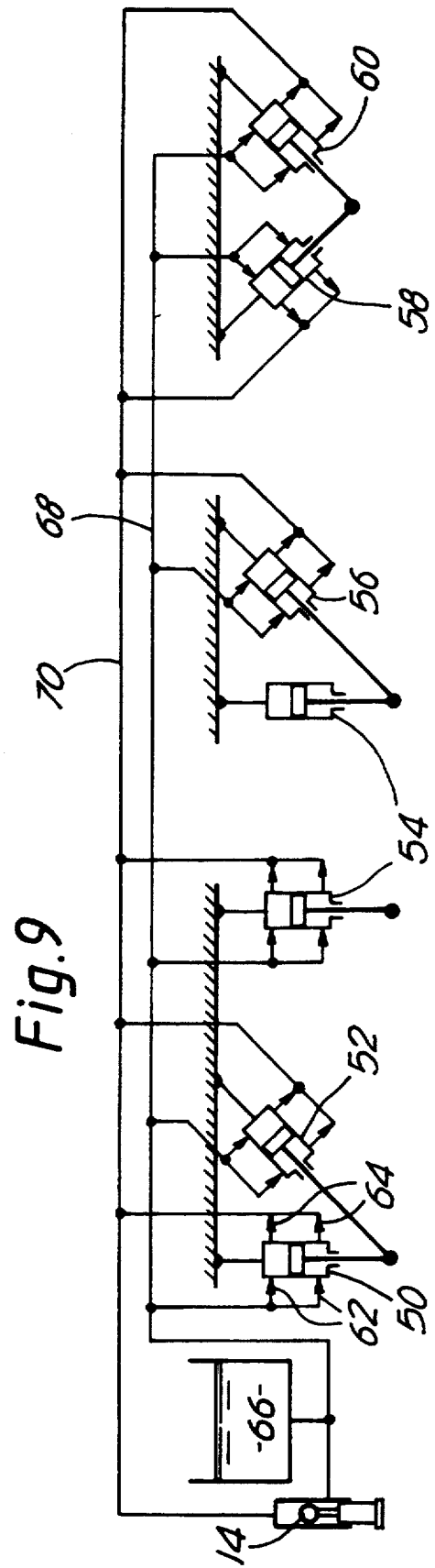
FIG. 9 is a schematic view of a control system for the part of the mounting arrangement shown in FIGS. 6, 7 and 8.

Each of the hydraulic rams 50-60 is in fluid communication with four one way valves (FIG. 9). Each hydraulic ram has two inlet valves 62 and two outlet valves 64. The inlet valves 62 are connected to a fluid reservoir 66 by a fluid inlet line 68. The outlet valves 64 are connected to the fluid reservoir 66 by a fluid return line 70. The flow of fluid from the outlet valves 64 through the return line 70 to the fluid reservoir 66 is controlled by a valve 74.

When the doors 19 of the nacelle 18 are closed a latch 72 on the doors 19 operates the valve 74 to open the fluid return line 70. Hydraulic fluid can flow through the return line 70 to the reservoir 66 allowing the hydraulic rams 50-60 to move freely. The engine 10 is then fully supported by the nacelle doors 19.

When the doors 19 of the nacelle 18 are opened the latch 72 is opened thus operating the valve 74 to close the fluid return line 70. Closure of the return line 70 prevents the flow of hydraulic fluid from the outlet valves 64 to the reservoir 66. The hydraulic rams 50-60 are locked in position and support the engine 10 from the pylon 21.

We claim:

1. A mounting arrangement for a gas turbine engine comprising a nacelle surrounding the casing of a gas turbine engine, the nacelle being attached via a support member to an aircraft structure from which the engine is to be mounted, at least a part of the nacelle being split to form a pair of opposing arcuate doors which are moveable between an open position to allow access to the engine and a closed position, there being provided means for structurally integrating the arcuate doors with the engine casing when the arcuate doors are closed so that all the engine loads are transmitted through the nacelle, there being further provided connecting means to connect the engine casing directly to the support member so that when the arcuate doors are open, the further connection means support the engine, all the engine loads being transmitted through the engine casing.

2. A mounting arrangement for a gas turbine engine comprising a nacelle surrounding the casing of a gas turbine engine, the nacelle being attached via a support member to an aircraft structure from which the engine is to be mounted, at least a part of the nacelle being split to form a pair of opposing arcuate doors which are moveable between an open position to allow access to the engine and a closed position, there being provided means for structurally integrating the arcuate doors with the engine casing when the arcuate doors are closed so that all the engine loads are transmitted through the nacelle, there being further provided connecting means to connect the engine casing directly to the support member so that when the arcuate doors are open, the further connection means support the engine, all the engine loads being transmitted through the engine casing, said arcuate doors each having an inner surface provided with a shaped groove, said means for structurally integrating the arcuate doors with the engine casing when closed comprising a ring provided on the engine casing which locates in said shaped groove in the inner surface of the arcuate doors.

3. A mounting arrangement as claimed in claim 2 in which the ring is integral with the engine casing.

4. A mounting arrangement as claimed in claim 2 in which the ring is a separate sectional structure, the sections being bolted together and located on the engine casing by spherical bearings.

5. A mounting arrangement as claimed in claim 2 in which the ring is provided at the upstream end of the engine casing.

6. A mounting system as claimed in claim 2 in which the ring has a V cross-section.

7. A mounting arrangement as claimed in claim 1 in which the further connection means which connect the engine to the support member when the arcuate doors are open are telescopic struts which are moveable between a retracted and an extended position and which are selectively locked in a position to support the engine.

8. A mounting arrangement as claimed in claim 7 in which the telescopic struts are selectively locked in a position to support the engine by a latch on the doors of the nacelle.

9. A mounting arrangement as claimed in claim 7 in which the telescopic struts are hydraulic rams.

10. A mounting arrangement as claimed in claim 1 in which the whole of the nacelle may be split to form the arcuate doors.

11. A mounting arrangement as claimed in claim 1 in which thrust reversers are provided in the arcuate doors of the nacelle.

12. A mounting arrangement as claimed in claim 1 in which the support member is a pylon.

13. A mounting arrangement as claimed in claim 1 in which the support member is attached to an aircraft wing.

* * * * *